United States Patent
Fujii et al.

(10) Patent No.: US 11,787,505 B1
(45) Date of Patent: Oct. 17, 2023

(54) LINKAGE AND DERAILLEUR FOR HUMAN-POWERED VEHICLE

(71) Applicant: SHIMANO INC., Sakai (JP)

(72) Inventors: Satoshi Fujii, Sakai (JP); Takashi Yamamoto, Sakai (JP)

(73) Assignee: SHIMANO INC., Sakai (JP)

( * ) Notice: Subject to any disclaimer, the term of this patent is extended or adjusted under 35 U.S.C. 154(b) by 0 days.

(21) Appl. No.: 17/719,306

(22) Filed: Apr. 12, 2022

(51) Int. Cl.
  B62M 9/1242 (2010.01)
  B62M 9/124 (2010.01)

(52) U.S. Cl.
  CPC .......... B62M 9/1242 (2013.01); B62M 9/124 (2013.01); *B62M 2009/12406* (2013.01)

(58) Field of Classification Search
  CPC ...... B62M 9/121; B62M 9/124; B62M 9/125; B62M 9/126; B62M 9/1242; B62M 9/1248; B62M 2009/12406; B62M 2009/12413; B62M 9/131; B62M 9/134; B62M 9/1342; B62M 9/1348
  See application file for complete search history.

(56) References Cited

U.S. PATENT DOCUMENTS

| | | | | | |
|---|---|---|---|---|---|
| 3,896,679 | A | * | 7/1975 | Huret | B62M 9/1242 474/134 |
| 4,443,208 | A | * | 4/1984 | Kozakae | B62M 9/1246 474/82 |
| 5,456,637 | A | * | 10/1995 | Chang | B62M 9/1244 474/78 |
| 6,162,140 | A | * | 12/2000 | Fukuda | B62M 25/08 474/81 |
| 6,315,688 | B1 | * | 11/2001 | McLaughlin | B62M 9/1242 474/82 |
| 7,291,079 | B2 | * | 11/2007 | Ichida | B62M 25/08 474/80 |
| 7,341,532 | B2 | * | 3/2008 | Ichida | B62M 9/132 474/70 |
| 7,527,571 | B2 | * | 5/2009 | Shahana | B62M 9/1248 474/82 |
| 7,824,285 | B2 | * | 11/2010 | Tan | B62M 9/127 474/82 |
| 8,007,383 | B2 | * | 8/2011 | Watarai | B62M 9/1242 474/81 |
| 8,025,598 | B2 | * | 9/2011 | Watarai | B62M 9/1242 474/82 |
| 9,469,378 | B2 | * | 10/2016 | Kuwayama | B62M 9/1342 |
| 9,637,199 | B2 | * | 5/2017 | Pasqua | B62M 9/126 |
| 10,239,579 | B2 | * | 3/2019 | Pasqua | B62M 9/122 |
| 10,501,147 | B2 | * | 12/2019 | Suyama | B62M 9/1244 |
| 2003/0207732 | A1 | * | 11/2003 | Fukuda | B62M 9/122 474/82 |

(Continued)

*Primary Examiner* — Michael R Mansen
*Assistant Examiner* — Raveen J Dias
(74) *Attorney, Agent, or Firm* — MORI & WARD, LLP (57) ABSTRACT

A linkage having a link arm including a first link and a second link. The first link includes a first hole and a second hole. The second link includes a third hole and a fourth hole. The first link and the second link are pivotally coupled to a first member about a first pivot axis, and are pivotally coupled to a second member about a second pivot axis spaced apart from the first pivot axis. The first hole and the third hole are provided coaxially with the first pivot axis. The second hole and the fourth hole are provided coaxially with the second pivot axis. The third hole is provided between the first hole and the first member in an axial direction with respect to the first pivot axis in a state where the first link is pivotally coupled to the first member about the first pivot axis.

24 Claims, 8 Drawing Sheets

(56) References Cited

U.S. PATENT DOCUMENTS

| | | | |
|---|---|---|---|
| 2005/0189158 A1* | 9/2005 | Ichida | B62M 25/08 180/260 |
| 2005/0192139 A1* | 9/2005 | Ichida | B62M 25/08 474/70 |
| 2006/0135301 A1* | 6/2006 | Shahana | B62M 9/1248 474/82 |
| 2007/0191159 A1* | 8/2007 | Fukuda | B62M 9/1242 474/70 |
| 2008/0096706 A1* | 4/2008 | Watarai | B62M 9/1242 474/82 |
| 2008/0103000 A1* | 5/2008 | Watarai | B62M 9/125 474/116 |
| 2008/0132364 A1* | 6/2008 | Ichida | B62M 25/08 474/70 |
| 2009/0215561 A1* | 8/2009 | Fukuda | B62M 9/122 474/82 |
| 2010/0184545 A1* | 7/2010 | Takachi | B62M 9/127 474/80 |
| 2014/0162817 A1 | 6/2014 | Yamaguchi | |
| 2014/0243129 A1* | 8/2014 | Pasqua | B62M 9/1248 474/82 |
| 2014/0243130 A1* | 8/2014 | Pasqua | B62M 9/125 474/82 |
| 2016/0075401 A1* | 3/2016 | Kuwayama | B62M 9/1342 474/80 |
| 2018/0237104 A1* | 8/2018 | Pasqua | B62M 9/125 |
| 2019/0351971 A1 | 11/2019 | Dueweling et al. | |
| 2020/0298935 A1* | 9/2020 | Wu | B62M 9/138 |
| 2022/0315165 A1* | 10/2022 | Furuya | B62M 9/1342 |
| 2022/0411017 A1* | 12/2022 | Braedt | B62M 9/125 |
| 2023/0002006 A1* | 1/2023 | Kok | B62M 9/1242 |
| 2023/0094467 A1* | 3/2023 | Marangon | B62M 9/1242 474/82 |
| 2023/0099532 A1* | 3/2023 | Pasqua | B62M 9/1246 474/82 |

* cited by examiner

LINKAGE AND DERAILLEUR FOR HUMAN-POWERED VEHICLE

BACKGROUND

Technical Field

The present invention relates to a linkage and a derailleur for a human-powered vehicle.

Background Information

A human-powered vehicle includes a link structure including an arm pivotally coupled to a first additional member and a second additional member. The arm includes a plurality of coupling holes coupled to the first additional member and the second additional member. It is preferable to improve rigidity of a part of the arm including such coupling holes.

SUMMARY

In accordance with a first aspect of the present invention, a linkage for a derailleur of a human-powered vehicle comprises a link attn. The link arm includes a first link and a second link. The first link includes a first hole and a second hole. The second link includes a third hole and a fourth hole. The first link and the second link are configured to be pivotally coupled to a first member about a first pivot axis. The first link and the second link are configured to be pivotally coupled to a second member about a second pivot axis spaced apart from the first pivot axis. The first hole and the third hole are provided coaxially with the first pivot axis. The second hole and the fourth hole are provided coaxially with the second pivot axis. The third hole is provided between the first hole and the first member in an axial direction with respect to the first pivot axis in a state where the first link is pivotally coupled to the first member about the first pivot axis.

With the linkage according to the first aspect, it is possible to make a distance defined between the first hole and the third hole shorter since the third hole is provided between the first hole and the first member in the axial direction compared to a case where the first member is provided between the first hole and the third hole. Thus, it is possible to improve rigidity of portions of the link arm including the first hole and the third hole compared to the case where the first member is provided between the first hole and the third hole.

In accordance with a second aspect of the present invention, the linkage according to the first aspect is configured so that the second link further includes a fifth hole being provided coaxially with the first pivot axis.

With the linkage according to the second aspect, it is possible to utilize the fifth hole to pivotally couple the link arm and the first member about the first pivot axis. Thus, it is possible to reliably improve rigidity of a portion of the link arm pivotally coupled to the first member.

In accordance with a third aspect of the present invention, a linkage for a derailleur of a human-powered vehicle comprises a link arm. The link arm includes a first link and a second link. The first link includes a first hole and a second hole. The second link includes a third hole, a fourth hole, and a fifth hole. The first link and the second link are configured to be pivotally coupled to a first member about a first pivot axis. The first link and the second link are configured to be pivotally coupled to a second member about a second pivot axis spaced apart from the first pivot axis. The first hole, the third hole and the fifth hole are provided coaxially with the first pivot axis. The second hole and the fourth hole are provided coaxially with the second pivot axis.

With the linkage according to the third aspect, it is possible to utilize the first hole, the third hole and fifth hole to pivotally couple the link arm and the first member about the first pivot axis. Thus, it is possible to improve rigidity of a portion of the link arm pivotally coupled to the first member.

In accordance with a fourth aspect of the present invention, the linkage according to the second or third aspect is configured so that the first hole and the third hole are spaced apart from the fifth hole along the first pivot axis.

With the linkage according to the fourth aspect, it is possible to make a distance defined between the fifth hole and one of the first hole and the third hole longer. The longer distance can make a pivot movement between the link arm and the first member more stable.

In accordance with a fifth aspect of the present invention, the linkage according to any one of the second to fourth aspects is configured so that a distance defined between the third hole and the fifth hole along the first pivot axis is shorter than a distance defined between the first hole and the fifth hole along the second pivot axis.

With the linkage according to the fifth aspect, it is possible to improve rigidity of portions of the link arm including the first hole and the second hole while making the pivot movement between the link arm and the first member more stable.

In accordance with a sixth aspect of the present invention, the linkage according to any one of the second to fifth aspects is configured so that a distance defined between the first hole and the fifth hole along the first pivot axis is shorter than a distance defined between the second hole and the fourth hole along the second pivot axis.

With the linkage according to the sixth aspect, it is possible to make portions of the link atm including the first hole and the fifth hole compact while making the pivot movement between the link arm and the first member more stable.

In accordance with a seventh aspect of the present invention, the linkage according to any one of the first to sixth aspects is configured so that the second hole is spaced apart from the fourth hole along the second pivot axis.

With the linkage according to the seventh aspect, it is possible to make a distance defined between the second hole and the fourth hole longer. The longer distance can make a pivot movement between the link arm and the second member more stable.

In accordance with an eighth aspect of the present invention, the linkage according to any one of the first to seventh aspects is configured so that a distance defined between the first hole and the third hole along the first pivot axis is shorter than a distance defined between the second hole and the fourth hole along the second pivot axis.

With the linkage according to the eighth aspect, it is possible to make the distance defined between the first hole and the third hole shorter. Thus, it is possible to improve rigidity of portions of the link arm including the first hole and the third hole compared to the distance defined between the first hole and the third hole is longer than or equal to the distance defined between the second hole and the fourth hole.

In accordance with a ninth aspect of the present invention, the linkage according to any one of the first to eighth aspects is configured so that the first hole is at least partially offset from the second hole in the axial direction with respect to the first pivot axis.

With the linkage according to the ninth aspect, it is possible to improve flexibility in arranging the first hole and the second hole compared to a case where the first hole is not offset from the second hole in the axial direction.

In accordance with a tenth aspect of the present invention, the linkage according to any one of the first to ninth aspects is configured so that the third hole is at least partially offset from the fourth hole in the axial direction with respect to the first pivot axis.

With the linkage according to the tenth aspect, it is possible to improve flexibility in arranging the third hole and the fourth hole compared to a case where the third hole is not offset from the fourth hole.

In accordance with an eleventh aspect of the present invention, the linkage according to any one of the first to tenth aspects further comprises a first link pin and a second link pin. The first link pin is provided in the first hole and the third hole. The second link pin is provided in the second hole and the fourth hole.

With the linkage according to the eleventh aspect, the first link pin and the second link pin can reliably couple the link arm to each of the first member and the second member.

In accordance with a twelfth aspect of the present invention, the linkage according to any one of the first to eleventh aspects is configured so that the first link is fastened to the second link.

With the linkage according to the twelfth aspect, it is possible to improve rigidity of the link arm while improving design flexibility of the link arm.

In accordance with a thirteenth aspect of the present invention, the linkage according to any one of the first to twelfth aspects further comprises a fastener fastening the first link and the second link.

With the linkage according to the thirteenth aspect, the fastener can reliably couple the first link and the second link.

In accordance with a fourteenth aspect of the present invention, the linkage according to the thirteenth aspect is configured so that the fastener includes a plurality of a fastening member.

With the linkage according to the fourteenth aspect, the plurality of fastening members can more reliably couple the first link and the second link.

In accordance with a fifteenth aspect of the present invention, the linkage according to any one of the first to fourteenth aspects is configured so that the first link is in contact with the second link.

With the linkage according to the fifteenth aspect, it is possible to stabilize a relative position between the first link and the second link.

In accordance with a sixteenth aspect of the present invention, the linkage according to any one of the first to fifteenth aspects is configured so that the first link is integrally provided as a one-piece unitary member. The second link is integrally provided as a one-piece unitary member and is a separate member from the first link.

With the linkage according to the sixteenth aspect, it is possible to improve at least one of productivity and rigidity of the first link and the second link.

In accordance with a seventeenth aspect of the present invention, the linkage according to any one of the first to sixteenth aspects further comprises a receiving part provided to the first link to receive force.

With the linkage according to the seventeenth aspect, it is possible to utilize the receiving part to couple the link arm and another member.

In accordance with an eighteenth aspect of the present invention, the linkage according to any one of the first to seventeenth aspects is configured so that the receiving part is a separate member from the first link and is attached to the first link.

With the linkage according to the eighteenth aspect, it is possible to improve design flexibility of at least one of the receiving part and the link arm.

In accordance with a nineteenth aspect of the present invention, the linkage according to any one of the first to eighteenth aspects is configured so that the first link includes a first part and a second part. The second link includes a third part, a fourth part, and an intermediate part. The first part includes a first hole. The second part includes a second hole. The third part includes a third hole. The fourth part includes a fourth hole. The intermediate part couples the third part and the fourth part.

With the linkage according to the nineteenth aspect, at least one of the first part, the second part, the third part, the fourth part, and the intermediate part can improve rigidity of the link arm while improving design flexibility of the link arm.

In accordance with a twentieth aspect of the present invention, the linkage according to the nineteenth aspect is configured so that the third part extends from the intermediate part. The fourth part extends from the intermediate part away from the third part.

With the linkage according to the twentieth aspect, it is possible to reduce a volume of the link arm while improving rigidity of the link arm.

In accordance with a twenty-first aspect of the present invention, the linkage according to the nineteenth or twentieth aspect is configured so that the first part is at least partially offset from the second part in the axial direction with respect to the first pivot axis.

With the linkage according to the twenty-first aspect, it is possible to improve flexibility in arranging the first part and the second part compared to a case where the first part is not offset from the second part in the axial direction.

In accordance with a twenty-second aspect of the present invention, the linkage according to any one of the nineteenth to twenty-first aspects is configured so that the third part is at least partially offset from the fourth part in the axial direction with respect to the first pivot axis.

With the linkage according to the twenty-second aspect, it is possible to improve flexibility in arranging the third part and the fourth part compared to a case where the third part is not offset from the fourth part in the axial direction.

In accordance with a twenty-third aspect of the present invention, a derailleur for a human-powered vehicle comprises a first member, a second member, and the linkage according to any one of the first to twenty-second aspects. The linkage is pivotally coupled to the first member about the first pivot axis. The linkage is pivotally coupled to the second member about the second pivot axis.

With the linkage according to the twenty-third aspect, it is possible to improve rigidity of the link arm of the linkage, improving rigidity of the derailleur.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

The embodiment(s) will now be described with reference to the accompanying drawings, wherein like reference numerals designate corresponding or identical elements throughout the various drawings.

Figure 1:
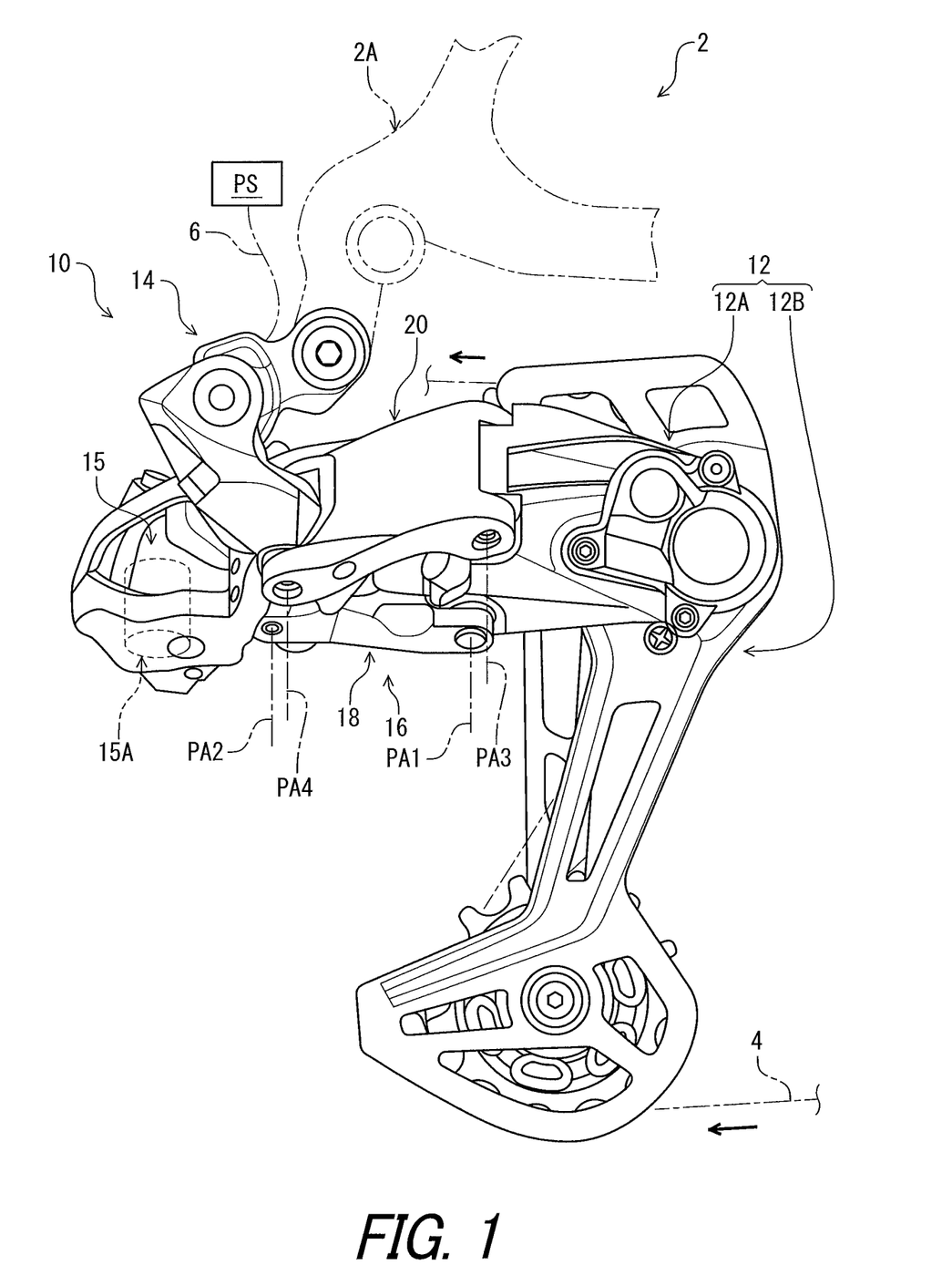
FIG. 1 is a side elevational view of a derailleur including a linkage in accordance with an embodiment.

As seen in FIG. 1, a human-powered vehicle 2 includes a derailleur 10. The derailleur 10 is configured to move a chain 4 relative to a sprocket assembly. The derailleur 10 is configured to be mounted to a vehicle body 2A of the human-powered vehicle 2.

The derailleur 10 for the human-powered vehicle 2 comprises a first member 12, a second member 14, and a linkage 16. The linkage 16 is pivotally coupled to the first member 12 about a first pivot axis PA1. The linkage 16 is pivotally coupled to the second member 14 about a second pivot axis PA2.

In the present embodiment, the second member 14 is configured to be mounted to the vehicle body 2A of the human-powered vehicle 2. The first member 12 includes a movable member 12A and a chain guide 12B. The movable member 12A is movably coupled to the second member 14 via the linkage 16. The chain guide 12B is rotatably coupled to the movable member 12A. The chain guide 12B is contactable with the chain 4. However, the structures of the first member 12 and the second member 14 are not limited to the illustrated structures.

The derailleur 10 comprises an actuator 15. The actuator 15 is attached to the second member 14. The actuator 15 is configured to move the first member 12 relative to the second member 14 using electricity supplied from an electric power source PS. The actuator 15 includes a motor 15A. The motor 15A is configured to generate actuating force using the electricity supplied from the electric power source PS. The actuator 15 is configured to be electrically connected to the electric power source PS via an electric cable 6. However, the electric power source PS can be directly attached to one of the first member 12, the second member 14, and the actuator 15 if needed and/or desired.

In the present embodiment, the derailleur 10 includes a rear derailleur configured to move the chain 4 relative to a rear sprocket assembly. However, the structure of the derailleur 10 can be applied to a front derailleur if needed and/or desired.

In the present disclosure, a human-powered vehicle is a vehicle to travel with a motive power including at least a human power of a user who rides the human-powered vehicle (i.e., rider). The human-powered vehicle includes a various kind of bicycles such as a mountain bike, a road bike, a city bike, a cargo bike, a hand bike, and a recumbent bike. Furthermore, the human-powered vehicle includes an electric bike (E-bike). The electric bike includes an electrically assisted bicycle configured to assist propulsion of a vehicle with an electric motor. However, a total number of wheels of the human-powered vehicle is not limited to two. For example, the human-powered vehicle includes a vehicle having one wheel or three or more wheels. Especially, the human-powered vehicle does not include a vehicle that uses only an internal-combustion engine as motive power. Generally, a light road vehicle, which includes a vehicle that does not require a driver's license for a public road, is assumed as the human-powered vehicle.

In the present disclosure, the following directional terms "front," "rear," "forward," "rearward," "left," "right," "transverse," "upward" and "downward" as well as any other similar directional terms refer to those directions which are determined on the basis of a user (e.g., a rider) who is in the user's standard position (e.g., on a saddle or a seat) in the human-powered vehicle 2 with facing a handlebar or a steering. Accordingly, these terms, as utilized to describe the derailleur 10 or other components, should be interpreted relative to the human-powered vehicle 2 equipped with the derailleur 10 or other components as used in an upright riding position on a horizontal surface.

In the present embodiment, the linkage 16 is pivotally coupled to the first member 12 about a third pivot axis PA3. The linkage 16 is pivotally coupled to the second member 14 about a fourth pivot axis PA4. However, at least one of the third pivot axis PA3 and the fourth pivot axis PA4 can be omitted from the derailleur 10 if needed and/or desired.

Figure 2:
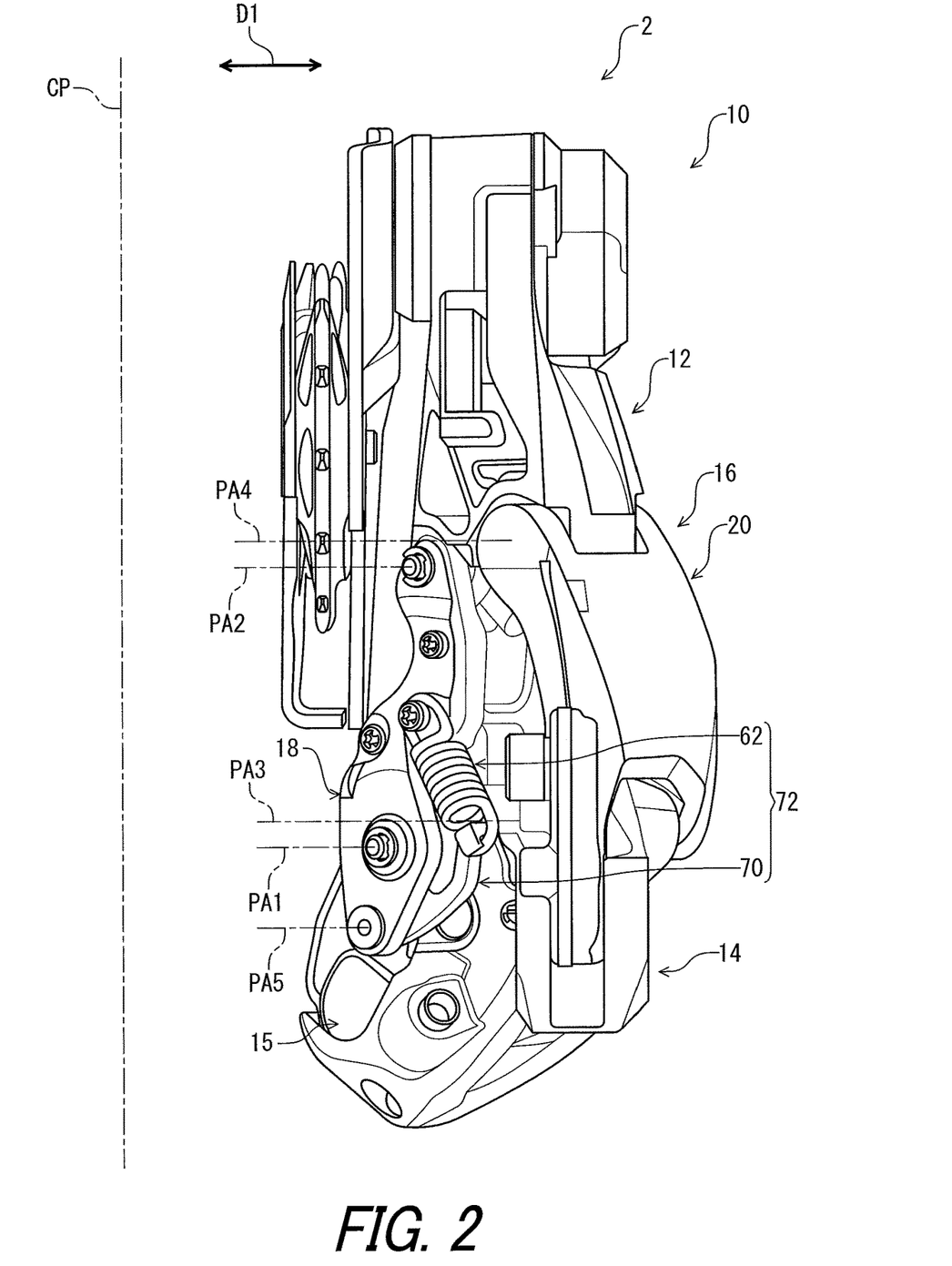
FIG. 2 is a top view of the derailleur illustrated in FIG. 1.

As seen in FIG. 2, the linkage 16 for the derailleur 10 of the human-powered vehicle 2 comprises a link arm 18. The link arm 18 is configured to be pivotally coupled to the first member 12 about the first pivot axis PA1. The link arm 18 is configured to be pivotally coupled to the second member 14 about the second pivot axis PA2.

In the present embodiment, the linkage 16 comprises an additional link arm 20. The additional link arm 20 is configured to be pivotally coupled to the first member 12 about the third pivot axis PA3. The additional link arm 20 is configured to be pivotally coupled to the second member 14 about the fourth pivot axis PA4. However, the additional link arm 20 can be omitted from the linkage 16 if needed and/or desired. The structure of the link arm 18 can be at least partially applied to the additional link arm 20 if needed and/or desired.

The link arm 18 can also be referred to as one of an inner link arm 18 and an outer link arm 18. In the present embodiment, the link arm 18 is configured to be at least partially provided on an inner side of the additional link arm 20 in a transverse direction D1 of the human-powered vehicle 2 in a mounting state where the derailleur 10 is mounted to the vehicle body 2A of the human-powered vehicle 2. The link arm 18 is configured to be at least partially provided closer to a transverse center plane CP of the human-powered vehicle 2 than the additional link arm 20 in the transverse direction D1 in the mounting state. The link arm 18 is configured to be partially provided on the inner side of the additional link arm 20 in the transverse direction D1 of the human-powered vehicle 2 in the mounting state. The link arm 18 is configured to be partially provided closer to the transverse center plane CP of the human-powered vehicle 2 than the additional link arm 20 in the transverse direction D1 in the mounting state. However, the link arm 18 can be configured to be at least partially provided on an outer side of the additional link arm 20 in the transverse direction D1 in the mounting state if needed and/or desired. The link arm 18 can be configured to be entirely provided on the inner side of the additional link arm 20 in the transverse direction D1 of the human-powered vehicle 2 in the mounting state if needed and/or desired. The link arm 18 can be configured to be entirely provided closer to the transverse center plane CP of the human-powered vehicle 2 than the additional link arm 20 in the transverse direction D1 in the mounting state if needed and/or desired. The link arm 18 can be configured to be at least partially provided farther from the transverse center plane CP than the additional link arm 20 in the transverse direction D1 in the mounting state if needed and/or desired.

Figure 3:
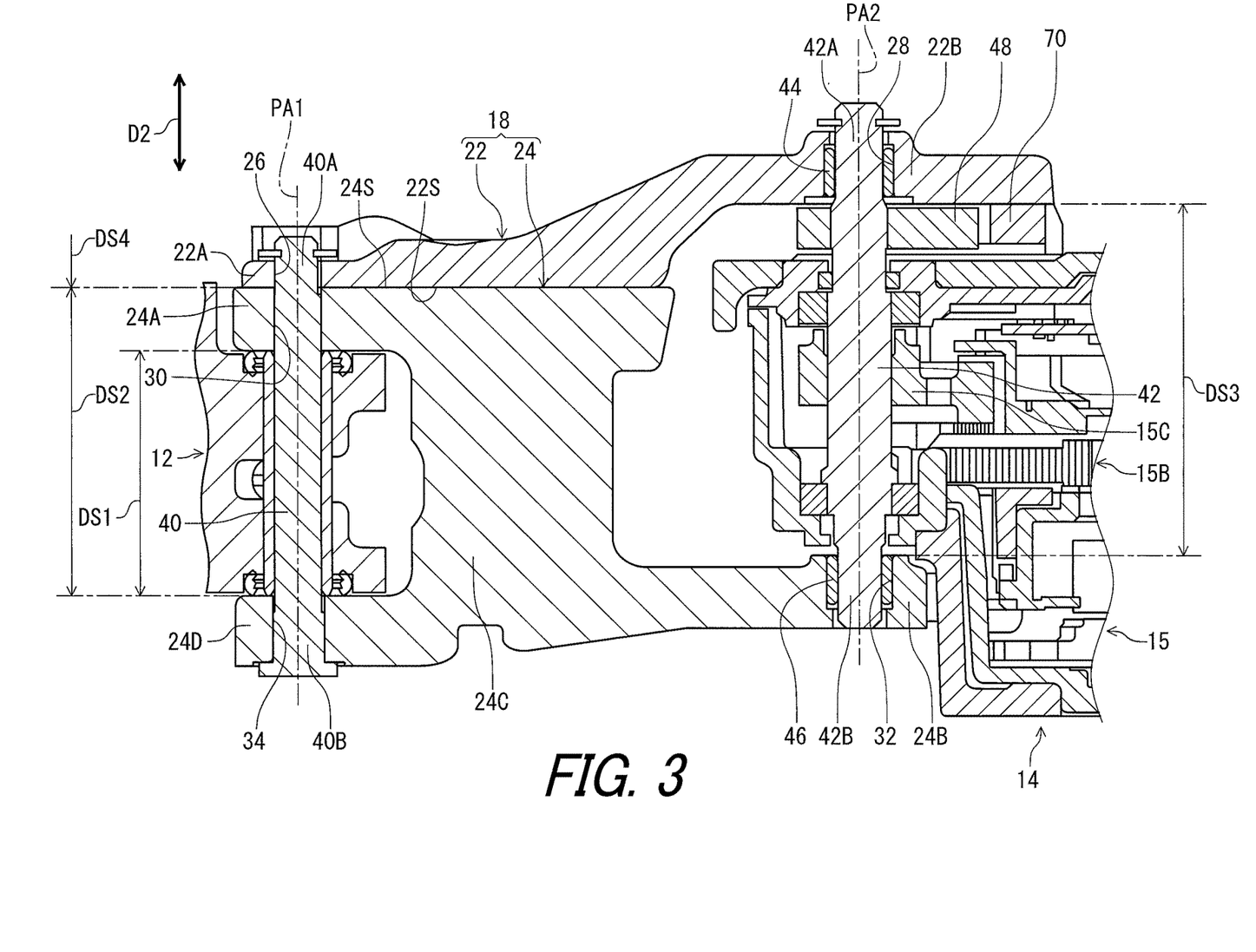
FIG. 3 is a cross-sectional view of the derailleur taken along line of FIG. 6.

As seen in FIG. 3, the link arm 18 includes a first link 22 and a second link 24. The first link 22 and the second link 24 are configured to be pivotally coupled to the first member 12 about the first pivot axis PA1. The first link 22 and the second link 24 are configured to be pivotally coupled to the second member 14 about the second pivot axis PA2 spaced apart from the first pivot axis PA1.

The first link 22 includes a first hole 26 and a second hole 28. The second link 24 includes a third hole 30 and a fourth hole 32. The first hole 26 and the third hole 30 are provided coaxially with the first pivot axis PA1. The second hole 28 and the fourth hole 32 are provided coaxially with the second pivot axis PA2.

The second link 24 includes a fifth hole 34. The fifth hole 34 is provided coaxially with the first pivot axis PA1. The first hole 26, the third hole 30 and the fifth hole 34 are provided coaxially with the first pivot axis PA1. The second hole 28 and the fourth hole 32 are provided coaxially with the second pivot axis PA2. The fifth hole 34 can be omitted from the second link 24 if needed and/or desired.

In the present embodiment, each of the first hole 26, the second hole 28, the third hole 30, the fourth hole 32, and the fifth hole 34 includes a through hole. However, at least one of the first hole 26, the second hole 28, the third hole 30, the fourth hole 32, and the fifth hole 34 can include a bottomed hole if needed and/or desired.

In the present embodiment, the first link 22 is made of a first material. The second link 24 is made of a second material. The second material can be the same as or different from the first material. Examples of the first material include carbon, aluminum, and iron. Examples of the second material include carbon, aluminum, and iron.

In the present embodiment, the first pivot axis PA1 is parallel to the second pivot axis PA2. The first pivot axis PA1 and the second pivot axis PA2 are defined to be parallel to an axial direction D2. However, the first pivot axis PA1 can be non-parallel to the second pivot axis PA2 if needed and/or desired.

As seen in FIG. 3, the third hole 30 is provided between the first hole 26 and the first member 12 in the axial direction D2 with respect to the first pivot axis PA1 in a state where the first link 22 is pivotally coupled to the first member 12 about the first pivot axis PA1. The second hole 28 is spaced apart from the fourth hole 32 along the second pivot axis PA2. The first hole 26 and the third hole 30 are spaced apart from the fifth hole 34 along the first pivot axis PA1. The third hole 30 is provide between the first hole 26 and the fifth hole 34 in the axial direction D2.

In the present embodiment, a distance DS1 defined between the third hole 30 and the fifth hole 34 along the first pivot axis PA1 is shorter than a distance DS2 defined between the first hole 26 and the fifth hole 34 along the second pivot axis PA2. The distance DS2 defined between the first hole 26 and the fifth hole 34 along the first pivot axis PA1 is shorter than a distance DS3 defined between the second hole 28 and the fourth hole 32 along the second pivot axis PA2. A distance DS4 defined between the first hole 26 and the third hole 30 along the first pivot axis PA1 is shorter than the distance DS3 defined between the second hole 28 and the fourth hole 32 along the second pivot axis PA2. The distance DS1 is defined between an end of the third hole 30 and an end of the fifth hole 34 along the first pivot axis PA1. The distance DS2 is defined between an end of the first hole 26 and the end of the fifth hole 34 along the first pivot axis PA1. The distance DS3 is defined between an end of the second hole 28 and an end of the fourth hole 32 along the second pivot axis PA2. The distance DS4 is defined between the end of the first hole 26 and an end of the third hole 30 along the first pivot axis PA1.

However, the distance DS1 defined between the third hole 30 and the fifth hole 34 along the first pivot axis PA1 can be longer than or equal to the distance DS2 defined between the first hole 26 and the fifth hole 34 along the second pivot axis PA2 if needed and/or desired. The distance DS2 defined between the first hole 26 and the fifth hole 34 along the first pivot axis PA1 can be longer than or equal to the distance DS3 defined between the second hole 28 and the fourth hole 32 along the second pivot axis PA2 if needed and/or desired. The distance DS4 defined between the first hole 26 and the third hole 30 along the first pivot axis PA1 can be longer than or equal to the distance DS3 defined between the second hole 28 and the fourth hole 32 along the second pivot axis PA2 if needed and/or desired.

In the present embodiment, the distance DS4 defined between the first hole 26 and the third hole 30 along the first pivot axis PA1 is zero since the first part 22A is in contact with the third part 24A. However, the distance DS4 defined between the first hole 26 and the third hole 30 along the first pivot axis PA1 can be longer than zero if needed and/or desired.

The first hole 26 is at least partially offset from the second hole 28 in the axial direction D2 with respect to the first pivot axis PA1. The first hole 26 is at least partially offset from the third hole 30 in the axial direction D2. The first hole 26 is at least partially offset from the fourth hole 32 in the axial direction D2. The first hole 26 is at least partially offset from the fifth hole 34 in the axial direction D2. In the present embodiment, the first hole 26 is entirely offset from each of the second hole 28, the third hole 30, the fourth hole 32, and the fifth hole 34 in the axial direction D2. However, the first hole 26 can be partially offset from at least one of the second hole 28, the third hole 30, the fourth hole 32, and the fifth hole 34 in the axial direction D2 if needed and/or desired. The first hole 26 can be provided in the same position as the position of at least one of the second hole 28, the third hole 30, the fourth hole 32, and the fifth hole 34 in the axial direction D2 if needed and/or desired.

The second hole 28 is at least partially offset from the third hole 30 in the axial direction D2. The second hole 28 is at least partially offset from the fourth hole 32 in the axial direction D2. The second hole 28 is at least partially offset from the fifth hole 34 in the axial direction D2. In the present embodiment, the second hole 28 is entirely offset from each of the third hole 30, the fourth hole 32, and the fifth hole 34 in the axial direction D2. However, the second hole 28 can be partially offset from at least one of the third hole 30, the fourth hole 32, and the fifth hole 34 in the axial direction D2 if needed and/or desired. The second hole 28 can be provided in the same position as the position of at least one of the third hole 30, the fourth hole 32, and the fifth hole 34 in the axial direction D2 if needed and/or desired.

The third hole 30 is at least partially offset from the fourth hole 32 in the axial direction D2 with respect to the first pivot axis PA1. The third hole 30 is at least partially offset from the fifth hole 34 in the axial direction D2. In the present embodiment, the third hole 30 is entirely offset from each of the fourth hole 32 and the fifth hole 34 in the axial direction D2. However, the third hole 30 can be partially offset from at least one of the fourth hole 32 and the fifth hole 34 in the axial direction D2 if needed and/or desired. The third hole 30 can be provided in the same position as the position of at least one of the fourth hole 32 and the fifth hole 34 in the axial direction D2 if needed and/or desired.

The fourth hole 32 is at least partially offset from the fifth hole 34 in the axial direction D2 with respect to the first pivot axis PA1. In the present embodiment, the fourth hole 32 is partially offset from the fifth hole 34 in the axial direction D2. However, the fourth hole 32 can be entirely offset from the fifth hole 34 in the axial direction D2 if needed and/or desired. The fourth hole 32 can be provided in the same position as the position of the fifth hole 34 in the axial direction D2 if needed and/or desired.

Figure 4:
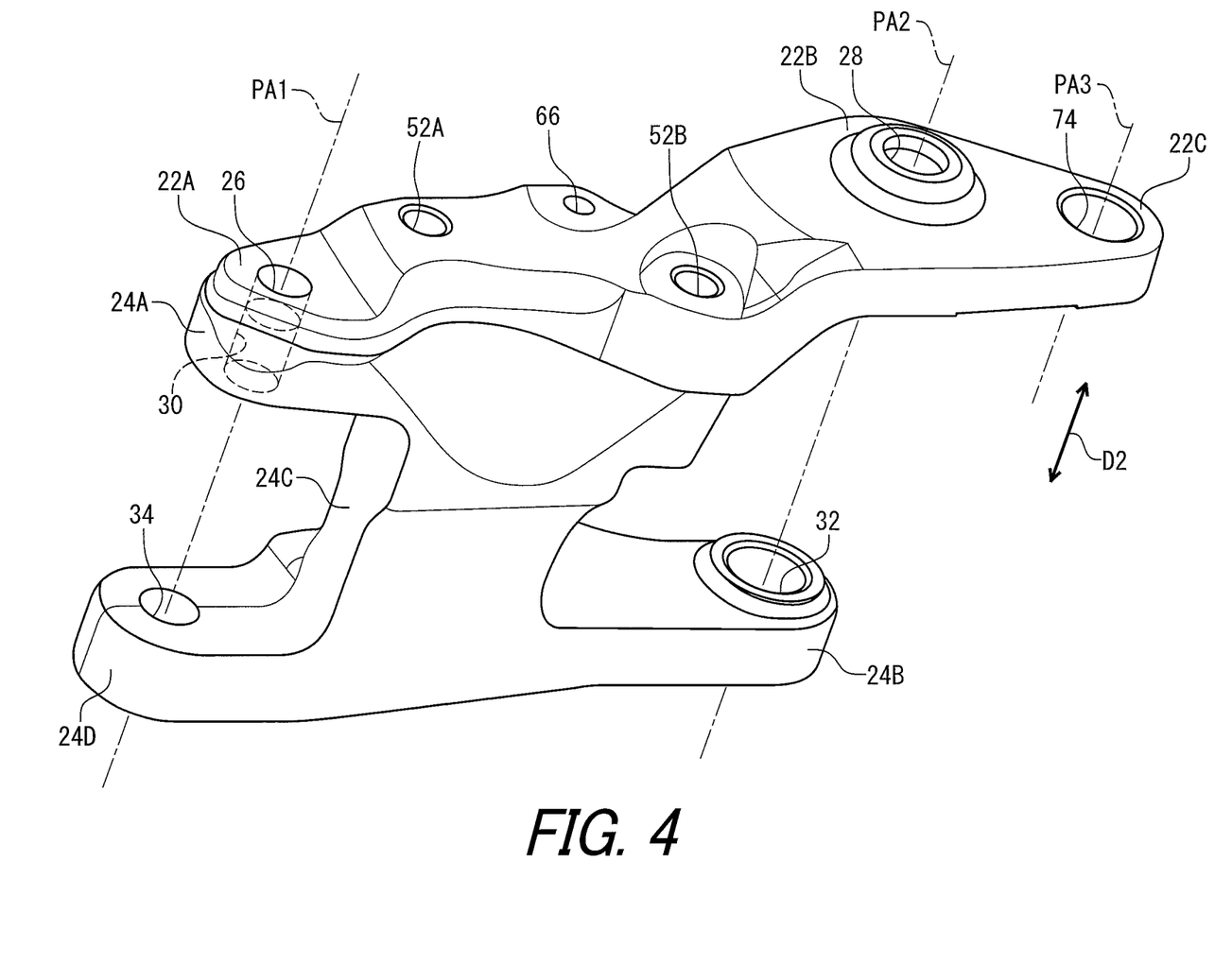
FIG. 4 is a perspective view of a link arm of the linkage illustrated in FIG. 1.

As seen in FIG. 4, the first link 22 includes a first part 22A and a second part 22B. The first part 22A includes the first hole 26. The second part 22B includes the second hole 28. The first link 22 extends from the first part 22A to the second part 22B.

The second link 24 includes a third part 24A, a fourth part 24B, and an intermediate part 24C. The third part 24A includes the third hole 30. The fourth part 24B includes the fourth hole 32. The intermediate part 24C couples the third part 24A and the fourth part 24B. The third part 24A extends from the intermediate part 24C. The fourth part 24B extends from the intermediate part 24C away from the third part 24A. The second link 24 includes a fifth part 24D. The fifth part 24D includes the fifth hole 34. The fifth part 24D extends from the intermediate part 24C away from the fourth part 24B.

As seen in FIG. 3, the first part 22A is at least partially offset from the second part 22B in the axial direction D2 with respect to the first pivot axis PA1. The third part 24A is at least partially offset from the fourth part 24B in the axial direction D2 with respect to the first pivot axis PA1. The third part 24A is at least partially offset from the fifth part 24D in the axial direction D2. The fourth part 24B is at least partially offset from the fifth part 24D in the axial direction D2.

In the present embodiment, the first part 22A is entirely offset from the second part 22B in the axial direction D2. The third part 24A is entirely offset from the fourth part 24B in the axial direction D2. The third part 24A is entirely offset from the fifth part 24D in the axial direction D2. The fourth part 24B is partially offset from the fifth part 24D in the axial direction D2.

However, the first part 22A can be partially offset from the second part 22B in the axial direction D2 if needed and/or desired. The third part 24A can be entirely offset from the fourth part 24B in the axial direction D2 if needed and/or desired. The third part 24A can be partially offset from the fifth part 24D in the axial direction D2 if needed and/or desired. The fourth part 24B can be entirely offset from the fifth part 24D in the axial direction D2 if needed and/or desired.

The third part 24A is provided between the first part 22A and the first member 12 in the axial direction D2 in the state where the first link 22 is pivotally coupled to the first member 12 about the first pivot axis PA1. The third part 24A is provided between the first part 22A and the fifth part 24D in the axial direction D2. However, the positional relationship between the first part 22A, the third part 24A, and the fifth part 24D is not limited to the illustrated embodiment. The fifth part 24D can be omitted from the second link 24 in a case where the fifth hole 34 is omitted from the second link 24.

As seen in FIG. 3, the linkage 16 further comprises a first link pin 40 and a second link pin 42. The first link pin 40 is provided in the first hole 26 and the third hole 30. The second link pin 42 is provided in the second hole 28 and the fourth hole 32. The first link pin 40 is provided in the first hole 26, the third hole 30, and the fifth hole 34. The first link pin 40 defines the first pivot axis PA1. The second link pin 42 defines the second pivot axis PA2.

The first link pin 40 includes a first end 40A and a first additional end 40B. The first link pin 40 extends from the first end 40A to the first additional end 40B. The first end 40A of the first link pin 40 is provided in the first hole 26. The first additional end 40B of the first link pin 40 is provided in the fifth hole 34.

The second link pin 42 includes a second end 42A and a second additional end 42B. The second link pin 42 extends from the second end 42A to the second additional end 42B. The second end 42A of the second link pin 42 is provided in the second hole 28. The second additional end 42B of the second link pin 42 is provided in the fourth hole 32.

The linkage 16 further comprises a first bush 44 and a second bush 46. The first bush 44 is provided in the second hole 28. The first bush 44 is provided between the first link 22 and the second link pin 42. The second bush 46 is provided between the fourth hole 32. The second bush 46 is provided between the second link 24 and the second link pin 42. At least one of the first bush 44 and the second bush 46 can be omitted from the linkage 16 if needed and/or desired. Another bush can be provided in at least one of the first hole 26, the third hole 30, and the fifth hole 34 if needed and/or desired.

The second link pin 42 is coupled to the actuator 15. The actuator 15 includes a gear structure 15B. The gear structure 15B is configured to transmit the actuating force generated by the motor 15A (see e.g., FIG. 1) to the second link pin 42. The gear structure 15B includes an output gear 15C. The output gear 15C is secured to the second link pin 42 to rotate about the second pivot axis PA2 relative to the second member 14 along with the second link pin 42.

The derailleur 10 includes an output member 48. The output member 48 is secured to the second link pin 42 to rotate about the second pivot axis PA2 relative to the second member 14 along with the second link pin 42. The output gear 15C, the second link pin 42, and the output member 48 are rotated about the second pivot axis PA2 relative to the second member 14 in response to the actuating force generated by the actuator 15.

As seen in FIG. 3, the first link 22 is integrally provided as a one-piece unitary member. The second link 24 is integrally provided as a one-piece unitary member and is a separate member from the first link 22. The first link 22 is in contact with the second link 24. The first link 22 includes a first surface 22S. The second link 24 includes a second surface 24S. The first surface 22S is in contact with the second surface 24S. In the present embodiment, each of the first surface 22S and the second surface 24S is a flat surface. However, at least one of the first surface 22S and the second surface 24S can include surfaces other than a flat surface if needed and/or desired.

Figure 5:
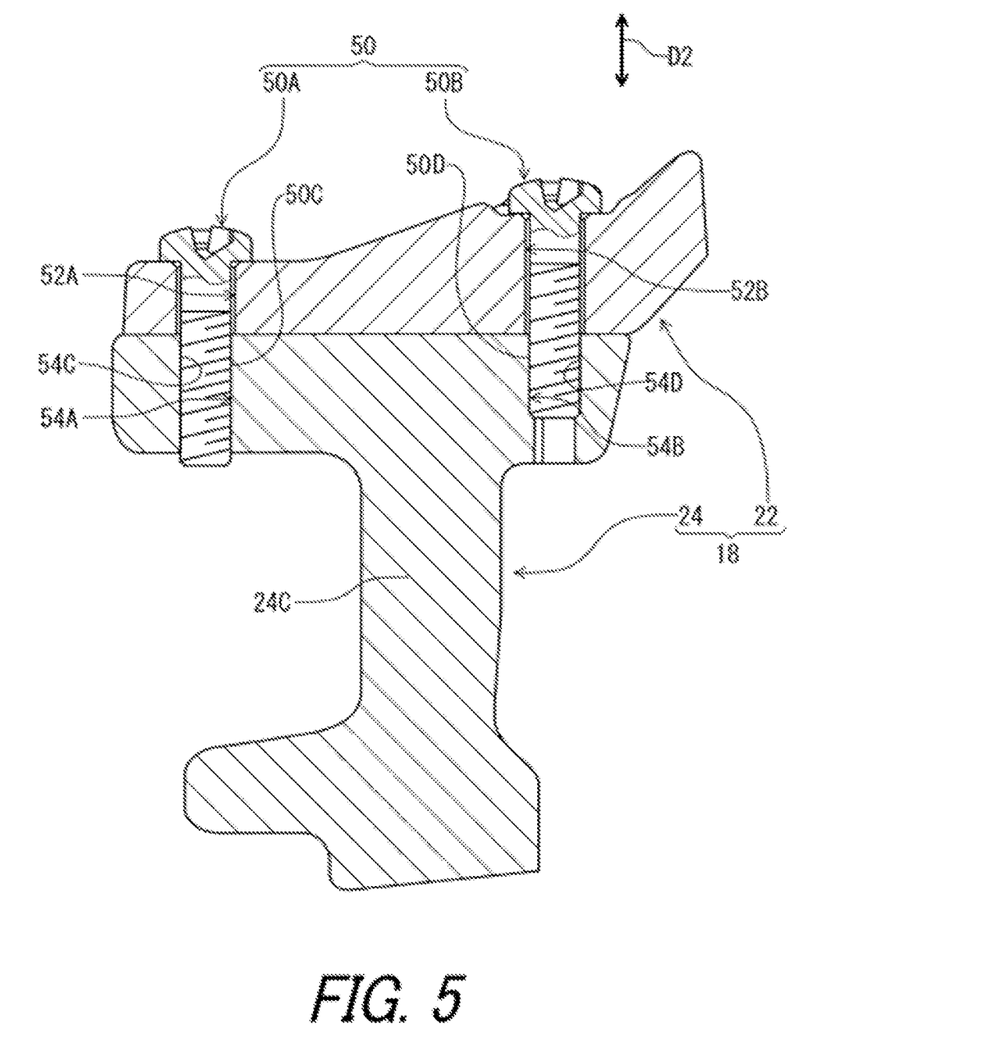
FIG. 5 is a cross-sectional view of the derailleur taken along line V-V of FIG. 6.

As seen in FIG. 5, the first link 22 is fastened to the second link 24. The linkage 16 further comprises a fastener 50 fastening the first link 22 and the second link 24. The fastener 50 includes a plurality of a fastening member 50A and 50B. The fastener 50 can include at least one fastening member if needed and/or desired. The first link 22 can be fastened to the second link 24 with another structure (e.g., an adhesive agent, press-fitting) other than the fastener 50 instead of or in addition to the fastener 50 if needed and/or desired. A total number of the fastening member is not limited to the illustrated embodiment.

The first link 22 includes a plurality of first fastener holes 52A and 52B. The second link 24 includes a plurality of second fastener holes 54A and 54B. The fastening member 50A is provided in the first fastener hole 52A and the second fastener hole 54A. The fastening member 50B is provided in the first fastener hole 52B and the second fastener hole 54B. The second fastener hole 54A includes a threaded hole 54C. The second fastener hole 54B includes a threaded hole 54D. The fastening member 50A includes an external thread 50C configured to be engaged with the threaded hole 54C of the second fastener hole 54A. The fastening member 50B includes an external thread 50D configured to be engaged with the threaded hole 54D of the second fastener hole 54B.

In the present embodiment, each of the fastening members 50A and 50B includes a screw. However, at least one of the fastening members 50A and 50B can include other structures such as a rivet if needed and/or desired.

The second fastener holes 54A and 54B are provided to the intermediate part 24C of the second link 24. However, at least one of the second fastener holes 54A and 54B can be provided to other parts of the second link 24 if needed and/or desired.

Figure 6:
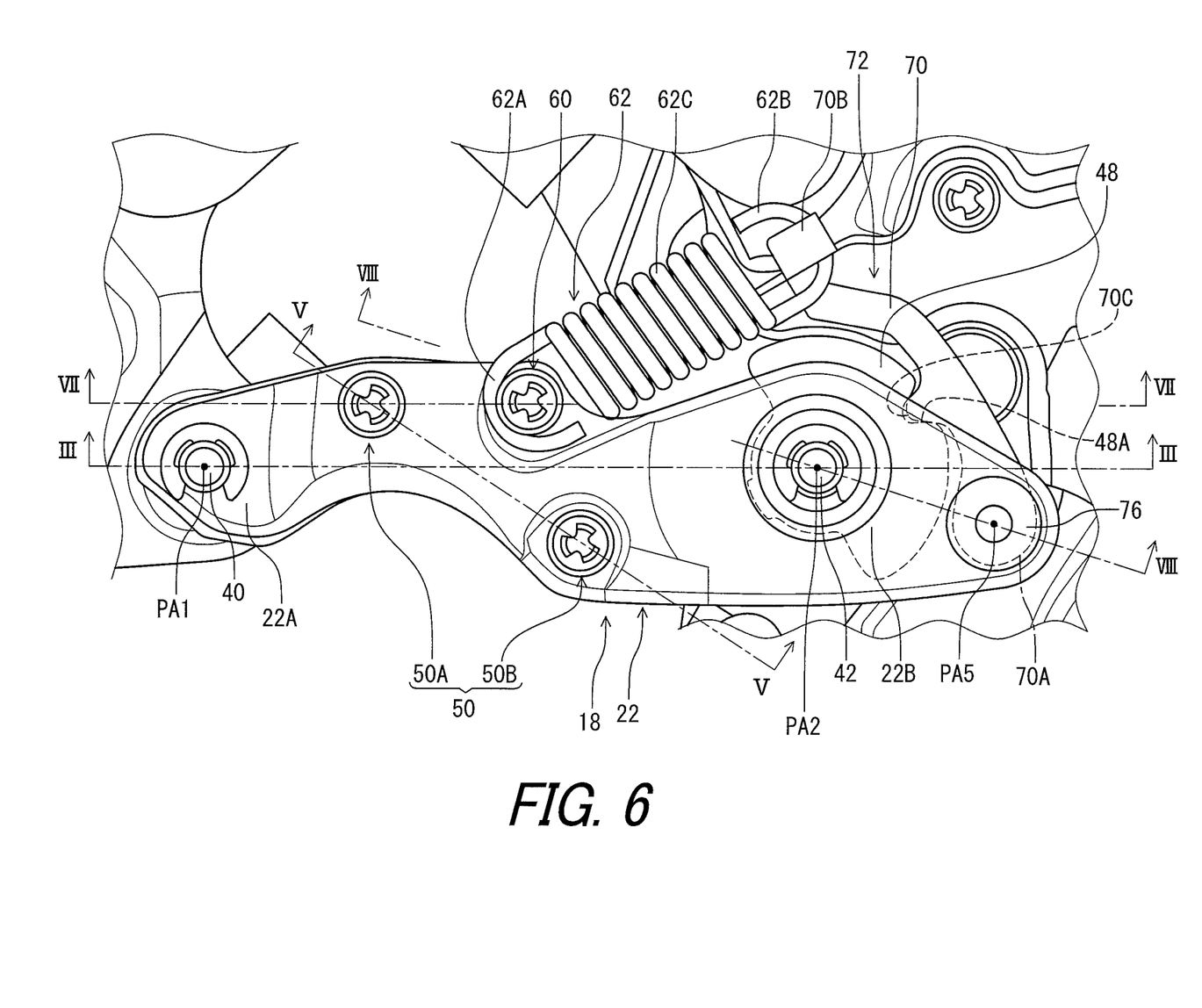
FIG. 6 is a plan view of the linkage of the derailleur illustrated in FIG. 1.

As seen in FIG. 6, the fastener 50 is at least partially provided between the first hole 26 and the second hole 28 as viewed along the first pivot axis PA1. The fastener 50 is at least partially provided between the first pivot axis PA1 and the second pivot axis PA2 as viewed along the first pivot axis PA1. The fastening members 50A and 50B are at least partially provided between the first hole 26 and the second hole 28 as viewed along the first pivot axis PA1. The fastening members 50A and 50B are at least partially provided between the first pivot axis PA1 and the second pivot axis PA2 as viewed along the first pivot axis PA1.

In the present embodiment, the fastener 50 is entirely provided between the first hole 26 and the second hole 28 as viewed along the first pivot axis PA1. The fastener 50 is entirely provided between the first pivot axis PA1 and the second pivot axis PA2 as viewed along the first pivot axis PA1. The fastening members 50A and 50B are entirely provided between the first hole 26 and the second hole 28 as viewed along the first pivot axis PA1. The fastening members 50A and 50B are entirely provided between the first pivot axis PA1 and the second pivot axis PA2 as viewed along the first pivot axis PA1.

However, the fastener 50 can be partially provided between the first hole 26 and the second hole 28 as viewed along the first pivot axis PA1 if needed and/or desired. The fastener 50 can be partially provided between the first pivot axis PA1 and the second pivot axis PA2 as viewed along the first pivot axis PA1 if needed and/or desired. The fastening members 50A and 50B can be partially provided between the first hole 26 and the second hole 28 as viewed along the first pivot axis PA1 if needed and/or desired. The fastening members 50A and 50B can be partially provided between the first pivot axis PA1 and the second pivot axis PA2 as viewed along the first pivot axis PA1 if needed and/or desired.

As seen in FIG. 6, the linkage 16 further comprises a receiving part 60 provided to the first link 22 to receive force. The derailleur 10 includes a biasing member 62 configured to generate biasing force. In the present embodiment, the receiving part 60 is configured to receive the biasing force of the biasing member 62. However, the receiving part 60 can be configured to receive force from members other than the biasing member 62 if needed and/or desired. The receiving part 60 can be omitted from the linkage 16 in a case where the biasing member 62 is omitted from the derailleur 10.

The biasing member 62 includes a first biasing end 62A, a second biasing end 62B, and a coiled part 62C. The coiled part 62C is provided between the first biasing end 62A and the second biasing end 62B. The first biasing end 62A is coupled to the first link 22 with the receiving part 60. The receiving part 60 couples the first link 22 and the first biasing end 62A.

The receiving part 60 is at least partially provided between the first hole 26 and the second hole 28 as viewed along the first pivot axis PA1. The receiving part 60 is at least partially provided between the first pivot axis PA1 and the second pivot axis PA2 as viewed along the first pivot axis PA1. In the present embodiment, the receiving part 60 is entirely provided between the first hole 26 and the second hole 28 as viewed along the first pivot axis PA1. The receiving part 60 is entirely provided between the first pivot axis PA1 and the second pivot axis PA2 as viewed along the first pivot axis PA1. However, the receiving part 60 can be partially provided between the first hole 26 and the second hole 28 as viewed along the first pivot axis PA1 if needed and/or desired. The receiving part 60 can be partially provided between the first pivot axis PA1 and the second pivot axis PA2 as viewed along the first pivot axis PA1 if needed and/or desired.

The receiving part 60 is at least partially provided between the fastening members 50A and 50B as viewed along the first pivot axis PA1. In the present embodiment, the receiving part 60 is entirely provided between the fastening members 50A and 50B as viewed along the first pivot axis PA1. However, the receiving part 60 can be partially provided between the fastening members 50A and 50B as viewed along the first pivot axis PA1 if needed and/or desired.

Figure 7:
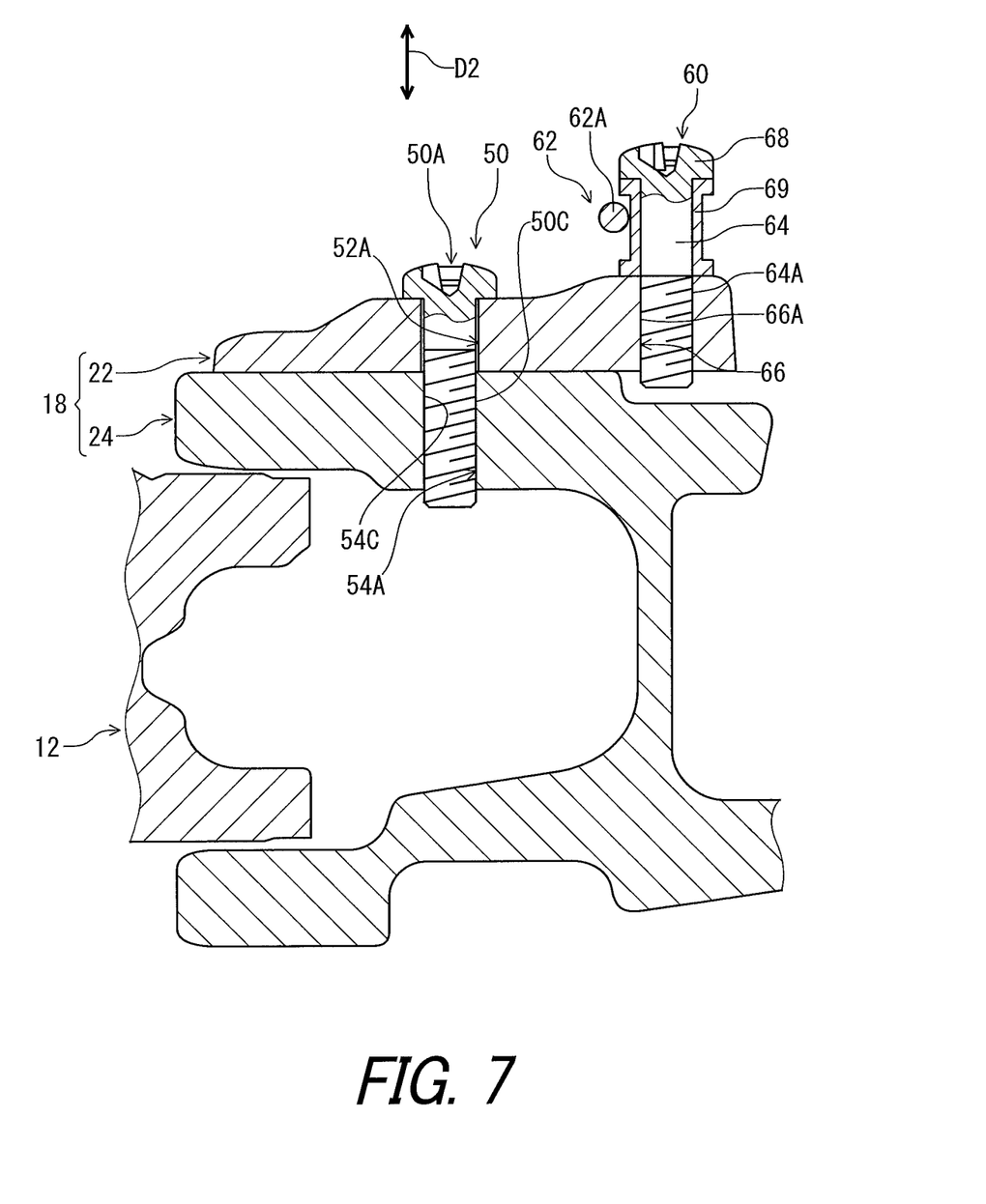
FIG. 7 is a cross-sectional view of the derailleur taken along line VII-VII of FIG. 6.

As seen in FIG. 7, the receiving part 60 is a separate member from the first link 22 and is attached to the first link 22. However, the receiving part 60 can be integrally provided with the first link 22 as a one-piece unitary member if needed and/or desired.

The receiving part 60 includes a rod 64. The first link 22 includes an attachment hole 66. The rod 64 of the receiving part 60 is provided in the attachment hole 66 of the first link 22. The attachment hole 66 includes a threaded hole 66A. The rod 64 includes an external thread 64A configured to be engaged with the threaded hole 66A of the attachment hole 66. The receiving part 60 includes a head 68 and a sleeve 69. The head 68 is provided at an end of the rod 64 to restrict the biasing member 62 from being dropped off from the first link 22. The sleeve 69 is attached to the rod 64 to be contactable with the first biasing end 62A of the biasing member 62. The sleeve 69 is held between the head 68 and the first link 22.

As seen in FIG. 3, the derailleur 10 comprises a transmitting member 70. The transmitting member 70 is pivotally coupled to the link arm 18 about a fifth pivot axis PA5. The transmitting member 70 is pivotally coupled to the first link 22 about the fifth pivot axis PA5. The fifth pivot axis PA5 is spaced apart from the first pivot axis PA1 and the second pivot axis PA2.

The transmitting member 70 and the biasing member 62 constitute a saver structure 72 configured to restrict external force applied to the first member 12 from being transmitted to the actuator 15. For example, the transmitting member 70 includes a first coupling end 70A and a second coupling end 70B. The transmitting member 70 extends from the first coupling end 70A and the second coupling end 70B. The first coupling end 70A is pivotally coupled to the link arm 18 about the fifth pivot axis PA5. The first coupling end 70A is pivotally coupled to the first link 22 about the fifth pivot axis PA5.

The transmitting member 70 is configured to be engaged with the output member 48 to transmit the actuating force from the output member 48 to the link arm 18. The transmitting member 70 is releasably engaged with the output member 48 not to transmit to the actuator 15 the external force applied to the first member 12. Examples of the external force include force caused by collision of the first member 12 (e.g., the chain guide 12B) against an object which is on a road.

The transmitting member 70 includes a protruding part 70C. The output member 48 includes a recess 48A. The protruding part 70C is configured to be provided in the recess 48A. The protruding part 70C is engaged with the recess 48A because of biasing force applied from the biasing member 62 to the transmitting member 70. The transmitting member 70 is rotated about the second pivot axis PA2 along with the output member 48 in an engagement state where the protruding part 70C is engaged with the recess 48A. The biasing force of the biasing member 62 is enough to transmit the actuating force from the output member 48 to the transmitting member 70 via the protruding part 70C and the recess 48A. The biasing force of the biasing member 62 is set to disengage the protruding part 70C from the recess 48A in response to the external force applied to the first member 12. Thus, the saver structure 72 is configured to restrict the external force applied to the first member 12 from being transmitted to the actuator 15. However, the biasing member 62 can be coupled to members other than the transmitting member 70 if needed and/or desired.

Figure 8:
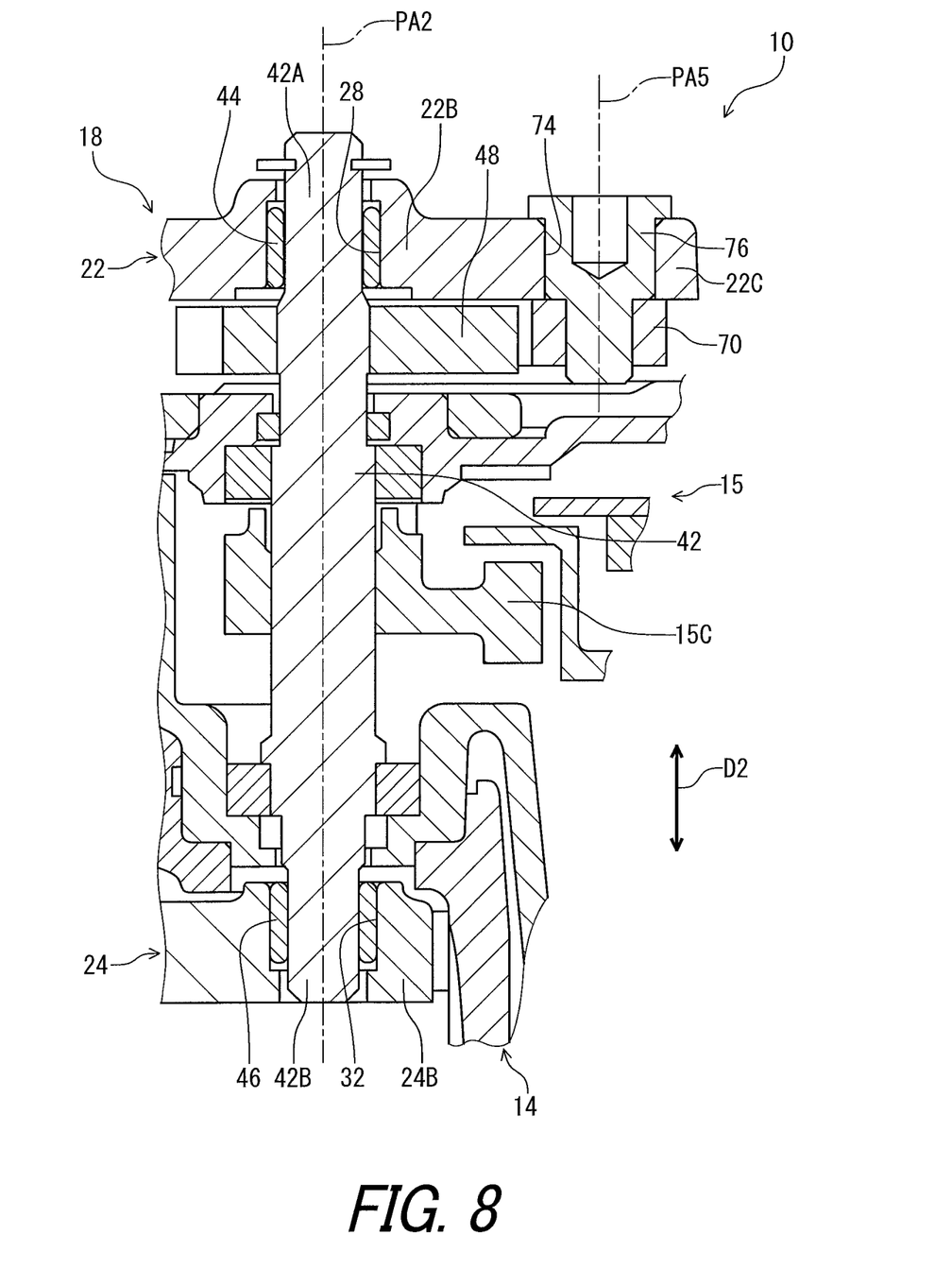
FIG. 8 is a cross-sectional view of the derailleur taken along line VIII-VIII of FIG. 6.

As seen in FIG. 8, the first link 22 includes a sixth hole 74. The link arm 18 includes a third link pin 76. The third link pin 76 is at least partially provided in the sixth hole 74. The third link pin 76 pivotally couples the first link 22 and the transmitting member 70 about the fifth pivot axis PA5.

As seen in FIG. 6, the second pivot axis PA2 is provided between the first pivot axis PA1 and the fifth pivot axis PA5 as viewed along the first pivot axis PA1. The first link 22 includes a sixth part 22C. The first link 22 extends from the first part 22A to the sixth part 22C. The second part 22B is provided between the first part 22A and the sixth part 22C as viewed along the first pivot axis PA1. As seen in FIG. 8, the sixth part 22C includes the sixth hole 74.

In the present disclosure, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. This concept also applies to words of similar meaning, for example, the terms "have," "include" and their derivatives.

The terms "member," "section," "portion," "part," "element," "body" and "structure" when used in the singular can have the dual meaning of a single part or a plurality of parts.

The ordinal numbers such as "first" and "second" recited in the present application are merely identifiers, but do not have any other meanings, for example, a particular order and the like. Moreover, for example, the term "first element" itself does not imply an existence of "second element," and the term "second element" itself does not imply an existence of "first element."

The term "pair of," as used herein, can encompass the configuration in which the pair of elements have different shapes or structures from each other in addition to the configuration in which the pair of elements have the same shapes or structures as each other.

The terms "a" (or "an"), "one or more" and "at least one" can be used interchangeably herein.

The phrase "at least one of" as used in this disclosure means "one or more" of a desired choice. For one example, the phrase "at least one of" as used in this disclosure means "only one single choice" or "both of two choices" if the number of its choices is two. For other example, the phrase "at least one of" as used in this disclosure means "only one single choice" or "any combination of equal to or more than two choices" if the number of its choices is equal to or more than three. For instance, the phrase "at least one of A and B" encompasses (1) A alone, (2), B alone, and (3) both A and B. The phrase "at least one of A, B, and C" encompasses (1) A alone, (2), B alone, (3) C alone, (4) both A and B, (5) both B and C, (6) both A and C, and (7) all A, B, and C. In other words, the phrase "at least one of A and B" does not mean "at least one of A and at least one of B" in this disclosure.

Finally, terms of degree such as "substantially," "about" and "approximately" as used herein mean a reasonable amount of deviation of the modified term such that the end result is not significantly changed. All of numerical values described in the present application can be construed as including the terms such as "substantially," "about" and "approximately."

Obviously, numerous modifications and variations of the present invention are possible in light of the above teachings. It is therefore to be understood that within the scope of the appended claims, the invention may be practiced otherwise than as specifically described herein.

What is claimed is:

1. A linkage for a derailleur of a human-powered vehicle, the linkage comprising:
   a link arm including:
      a first link including a first hole and a second hole; and
      a second link including a third hole and a fourth hole,
   the first link and the second link being configured to be pivotally coupled to a first member about a first pivot axis, the first link and the second link being configured to be pivotally coupled to a second member about a second pivot axis spaced apart from the first pivot axis,
   the first hole and the third hole being provided coaxially with the first pivot axis,
   the second hole and the fourth hole being provided coaxially with the second pivot axis,
   the third hole being provided between the first hole and the first member in an axial direction with respect to the first pivot axis in a state where the first link is pivotally coupled to the first member about the first pivot axis,
   the second link being integrally provided as a one-piece unitary member, and
   the third hole is at least partially offset from the fourth hole in the axial direction with respect to the first pivot axis.

2. The linkage accordingly to claim 1, wherein
the second link further includes a fifth hole being provided coaxially with the first pivot axis.

3. The linkage according to claim 1, wherein
the second hole is spaced apart from the fourth hole along the second pivot axis.

4. The linkage according to claim 1, wherein
a distance defined between the first hole and the third hole along the first pivot axis is shorter than a distance defined between the second hole and the fourth hole along the second pivot axis.

5. The linkage according to claim 1, further comprising:
a first link pin provided in the first hole and the third hole; and
a second link pin provided in the second hole and the fourth hole.

6. The linkage according to claim 1, wherein
the first link is fastened to the second link.

7. The linkage according to claim 1, further comprising
a fastener fastening the first link and the second link.

8. The linkage according to claim 7, wherein
the fastener includes a plurality of a fastening member.

9. The linkage according to claim 1, wherein
the first link is in contact with the second link.

10. The linkage according to claim 1, wherein
the first link is integrally provided as a one-piece unitary member, and
the second link is a separate member from the first link.

11. The linkage according to claim 1, further comprising
a receiving part provided to the first link to receive force.

12. The linkage according to claim 11, wherein
the receiving part is a separate member from the first link and is attached to the first link.

13. The linkage according to claim 1, wherein
the first link includes a first part and a second part,
the second link includes a third part, a fourth part, and an intermediate part,
the first part includes the first hole,
the second part includes the second hole,
the third part includes the third hole,
the fourth part includes the fourth hole, and
the intermediate part couples the third part and the fourth part.

14. The linkage according to claim 13, wherein
the third part extends from the intermediate part, and
the fourth part extends from the intermediate part away from the third part.

15. The linkage according to claim 13, wherein
the third part is at least partially offset from the fourth part in the axial direction with respect to the first pivot axis.

16. The linkage according to claim 1, wherein
the second link is entirely located outside of a space between the first link and the second member.

17. The linkage according to claim 1, wherein
the second link is not provided between the second member and the first link.

18. A linkage for a derailleur of a human-powered vehicle, the linkage comprising:
a link arm including:
a first link including a first hole and a second hole; and
a second link including a third hole, a fourth hole, and a fifth hole, the second link being integrally provided as a one-piece unitary member,
the first link and the second link being configured to be pivotally coupled to a first member about a first pivot axis, the first link and the second link being configured to be pivotally coupled to a second member about a second pivot axis spaced apart from the first pivot axis,
the first hole, the third hole and the fifth hole being provided coaxially with the first pivot axis, and
the second hole and the fourth hole being provided coaxially with the second pivot axis.

19. The linkage according to claim 18, wherein
the first hole and the third hole are spaced apart from the fifth hole along the first pivot axis.

20. The linkage according to claim 18, wherein
a distance defined between the third hole and the fifth hole along the first pivot axis is shorter than a distance defined between the first hole and the fifth hole along the second pivot axis.

21. The linkage according to claim 18, wherein
a distance defined between the first hole and the fifth hole along the first pivot axis is shorter than a distance defined between the second hole and the fourth hole along the second pivot axis.

22. A linkage for a derailleur of a human-powered vehicle, the linkage comprising:
a link arm including:
a first link including a first hole and a second hole; and
a second link including a third hole and a fourth hole,
the first link and the second link being configured to be pivotally coupled to a first member about a first pivot axis, the first link and the second link being configured to be pivotally coupled to a second member about a second pivot axis spaced apart from the first pivot axis,
the first hole and the third hole being provided coaxially with the first pivot axis,
the second hole and the fourth hole being provided coaxially with the second pivot axis,
the third hole being provided between the first hole and the first member in an axial direction with respect to the first pivot axis in a state where the first link is pivotally coupled to the first member about the first pivot axis, and
the first hole is at least partially offset from the second hole in the axial direction with respect to the first pivot axis.

23. A linkage for a derailleur of a human-powered vehicle, the linkage comprising:
a link arm including:
a first link including a first hole and a second hole; and
a second link including a third hole and a fourth hole,
the first link and the second link being configured to be pivotally coupled to a first member about a first pivot axis, the first link and the second link being configured to be pivotally coupled to a second member about a second pivot axis spaced apart from the first pivot axis,
the first hole and the third hole being provided coaxially with the first pivot axis,
the second hole and the fourth hole being provided coaxially with the second pivot axis,
the third hole being provided between the first hole and the first member in an axial direction with respect to the first pivot axis in a state where the first link is pivotally coupled to the first member about the first pivot axis,
the first link includes a first part and a second part,
the second link includes a third part, a fourth part, and an intermediate part,
the first part includes the first hole,
the second part includes the second hole,
the third part includes the third hole,
the fourth part includes the fourth hole, the intermediate part couples the third part and the fourth part, and the first part is at least partially offset from the second part in the axial direction with respect to the first pivot axis.

24. A derailleur for a human-powered vehicle, the derailleur comprising:
- a first member;
- a second member; and
- the linkage according to claim 1,
- the linkage being pivotally coupled to the first member about the first pivot axis, and
- the linkage being pivotally coupled to the second member about the second pivot axis.

* * * * *